United States Patent [19]
Yoshida et al.

[11] Patent Number: 6,148,616
[45] Date of Patent: Nov. 21, 2000

[54] TURBOCHARGER CONTROL SYSTEM FOR TURBOCHARGED INTERNAL COMBUSTION ENGINES EQUIPPED WITH EXHAUST-GAS RECIRCULATION CONTROL SYSTEM

[75] Inventors: Junichiro Yoshida; Hiroki Sakamoto, both of Yokohama, Japan

[73] Assignee: Nissan Motor Co., Ltd., Yokohama, Japan

[21] Appl. No.: 09/330,989

[22] Filed: Jun. 14, 1999

[30] Foreign Application Priority Data

Jun. 15, 1998 [JP] Japan .................................. 10-167175

[51] Int. Cl.[7] ............................ F02B 37/22; F02M 25/07
[52] U.S. Cl. ............................................................. 60/605.2
[58] Field of Search ...................... 60/605.2, 602

[56] References Cited

U.S. PATENT DOCUMENTS

| | | | |
|---|---|---|---|
| 5,778,674 | 7/1998 | Kimura | 60/605.2 |
| 5,791,146 | 8/1998 | Dungner | 60/605.2 |
| 5,794,445 | 8/1998 | Dungner | 60/605.2 |
| 6,029,451 | 2/2000 | Gartner | 60/605.2 |
| 6,035,639 | 3/2000 | Kolmanovsky et al. | 60/605.2 |
| 6,076,353 | 6/2000 | Freudenberg et al. | 60/605.2 |

FOREIGN PATENT DOCUMENTS

| | | |
|---|---|---|
| 58-176417 | 10/1983 | Japan . |
| 60-230555 | 11/1985 | Japan . |

*Primary Examiner*—Michael Koczo
*Attorney, Agent, or Firm*—Foley & Lardner

[57] ABSTRACT

A turbocharger control system for a turbocharged internal combustion engine equipped with an exhaust-gas gas recirculation control system recycling part of inert exhaust gas back through the engine under predetermined operating conditions of the engine, comprises a variable-displacement turbocharger variably adjusting a turbo-charging state. Also provided is a turbocharger control unit which corrects a controlled quantity of the variable-displacement turbocharger in response to correction made to a desired EGR rate for the exhaust-gas recirculation control system.

14 Claims, 8 Drawing Sheets

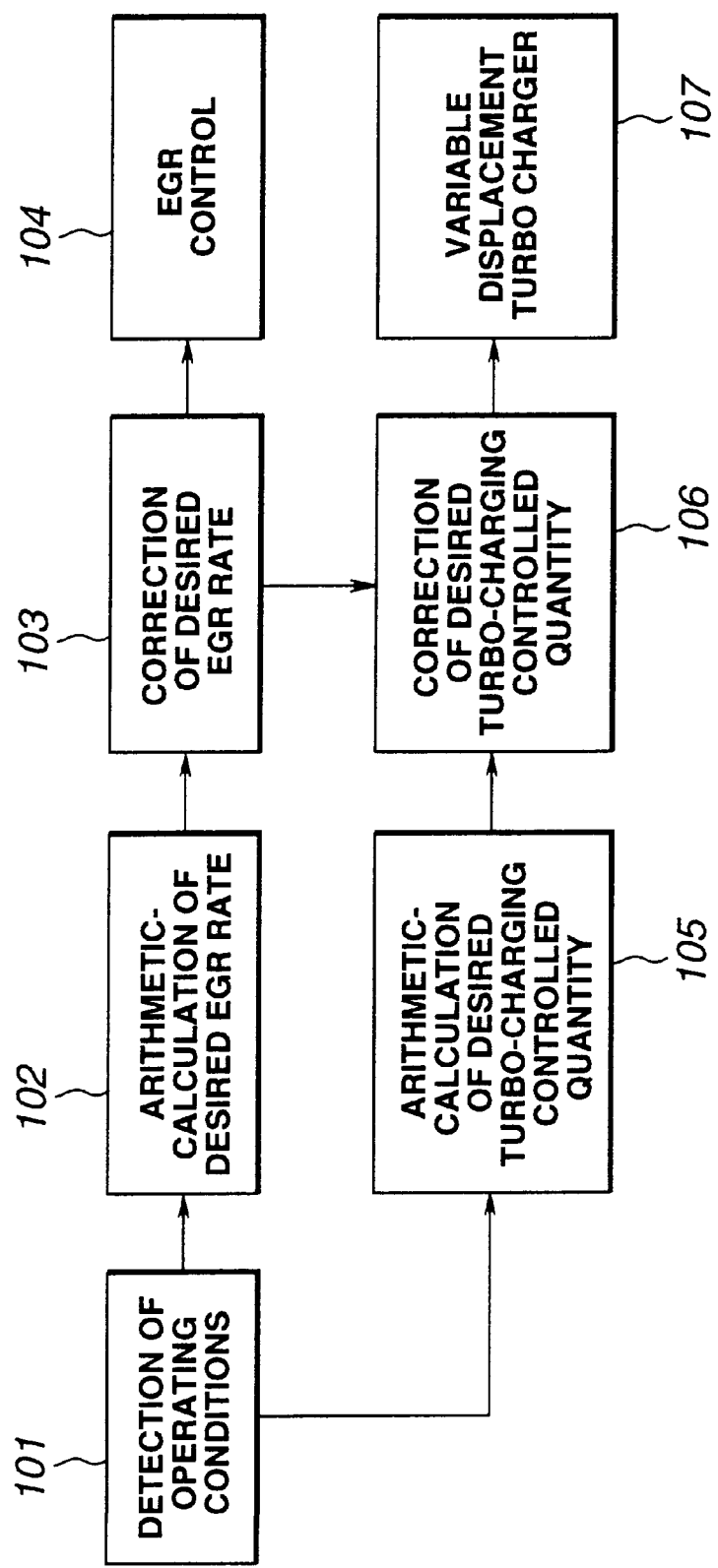

TURBOCHARGER CONTROL SYSTEM FOR TURBOCHARGED INTERNAL COMBUSTION ENGINES EQUIPPED WITH EXHAUST-GAS RECIRCULATION CONTROL SYSTEM

BACKGROUND OF THE INVENTION

1. Field of the Invention

The present invention relates to the improvements of a turbo-charger control system for a turbocharged internal combustion engine equipped with an exhaust-gas recirculation control system, specifically to techniques for cross-correlation between exhaust-gas recirculation (EGR) control and turbocharger control during EGR addition particularly on diesel engines equipped with a variable displacement turbocharger and an exhaust-gas recirculation system.

2. Description of the Prior Art

A more earlier-model-internal combustion engine is often equipped with a variable displacement (often called as a "variable nozzle") turbocharger in which an inlet opening area (or an opening size) between respective two adjacent vanes or blades of a turbine wheel is variably controlled depending on engine operating conditions. One such variable nozzle control device for a variable-nozzle turbocharger has been disclosed in Japanese Patent Provisional Publication No. 58-176417. On the other hand, almost all of automotive internal combustion engines have exhaust-gas recirculation systems, which are used to reduce nitrogen oxide ($NO_x$) emissions from exhaust gases of the engine by way of the fall of combustion temperature, caused by recycling of some of the inert exhaust gas back through an intake manifold. One such EGR system has been disclosed in Japanese Patent Provisional Publication No. 60-230555. On one hand, EGR is useful to decrease the formation of $NO_x$. On the other hand, undesiredly excessive EGR deteriorates combustion, thus dropping engine power output, and also reducing driveability of the vehicle. In recent years, it is desirable to achieve high-precision EGR control in due consideration of various factors, namely engine temperature (during cold engine start, during warming-up period, or in the engine warmed-up state), the reduced effective opening of an EGR control valve occurring owing to lubricating oil (engine oil) or a product of combustion (carbon deposits) adhered to the EGR control valve, changes in an intake-air flow rate occurring due to changes in air density, arising from changes in environment from low-land driving to high-land driving under constant engine speed and load, and the delay in boost pressure (often called "turbo-lag") on turbo-charged engines in a transient state, such as in a transition from normal-straight ahead driving to heavy vehicle acceleration.

SUMMARY OF THE INVENTION

Heretofore, there is no technique for cross-correlation between exhaust-gas recirculation (EGR) control made to an EGR system and turbosupercharger control (simply turbo-charger control) made to a variable-displacement turbo-charger during EGR addition. Gasoline engines utilize a comparatively small amount of EGR, so that a rate of exhaust gas recirculated (simply an EGR rate) is properly regulated within a comparatively small EGR-rate range. A turbo-supercharging state of the gasoline engine is not so affected by exhaust-gas recirculation (EGR). In contrast to the above, on turbo-charged diesel engines, where an EGR rate is widely regulated from a predetermined minimum EGR rate (with an EGR control valve closed) to a predetermined maximum EGR rate at which the quantity of EGR is nearly equal to the actually-induced fresh air flow rate (the actual intake-air flow rate), the exhaust-gas flow rate remarkably varies owing to changes in the EGR rate. For example, a greatly-increased EGR rate largely reduces the exhaust-gas flow rate, thereby reducing the energy (in exhaust-gas flow) input to the turbine wheel. Such a greatly-increased EGR has a great influence (i.e., a remarkable fall in boost pressure) on the turbo-charging state. In this case, it is desirable to increase the controlled quantity (the controlled variable) of a fluid-flow throttling degree or a fluid-flow restricting degree of the inlet side of the turbine wheel of the turbocharger, (in other words, to decrease the opening size of the inlet side of the turbine wheel), so as to rise the boost pressure provided by the turbocharger. Generally, a desired EGR rate is preset or preprogrammed for every engine operating ranges different from each other depending on engine speed and load. As regards variations in the desired EGR rate predetermined or preset for every operating ranges, it is possible to preset a desired controlled quantity of turbo-charging operation of the turbocharger, simply a desired turbo-charging controlled quantity, corresponding to a preset desired EGR rate for each engine operating range. However, there is an increased tendency of undesirable rise in boost pressure during transient-state running (rather than during steady-state running), for example, in a transient state from cold-engine acceleration to completion of warm up of the engine. When input information data (engine speed, engine load, engine temperature, and the like) are within respective EGR permission zones or ranges during cold diesel-engine acceleration operation or during starting and warming up from cold, the EGR rate is decreasingly corrected or EGR is almost stopped. In such a transient state where there is an increased tendency of switching between the EGR permission mode and the EGR inhibition mode, assuming that the turbocharger control is executed in accordance with a relatively great EGR rate suitable for an engine warmed-up state and thus the controlled quantity of the fluid-flow restricting degree of the inlet side of the turbocharger is regulated in a direction rising the boost pressure, there is a tendency for the boost pressure to excessively rise. Thereafter, as the engine/vehicle accelerates, the input informational data such as the engine temperature (or engine coolant temperature), the engine speed, the engine load, and the like will be out of the EGR permission zones and be transferred to an EGR inhibition zone where an EGR mode is inhibited. Under such an EGR inhibition, if the controlled quantity of the fluid-flow restricting degree of the inlet side of the turbocharger remains kept great, the boost pressure tends to further rise owing to the increased exhaust-gas flow. Furthermore, there is a problem of mutual interference (undesirable system hunting) between the EGR control system and the turbocharger control system, when feedback control is made with regard to the turbocharger during execution of the EGR control or during EGR addition. A certain method for providing stable system control and for avoiding the undesirable system hunting is to execute feedback control for the turbocharger only during inhibition of EGR (or only in a non-EGR region). However, if feedback correction for the turbo-charging controlled quantity is executed from a time when shifting to the non-EGR region during the transient operating state, and then the turbocharger control system begins to decreasingly correct boost pressure, there may be a comparatively great delay of response time. Owing to the delay of response time, the rise in boost pressure cannot be timely adequately suppressed. As discussed above, in the previously-noted transient state, it is difficult to attain satisfactory cross-correlation control between the EGR control system and the variable-displacement turbocharger during EGR addition by way of only feedback control.

Accordingly, it is an object of the invention to provide a turbocharger control system for a turbocharged internal combustion engine equipped with an exhaust-gas recirculation system which avoids the aforementioned disadvantages of the prior art.

It is another object of the invention to provide a turbocharger control system for an internal combustion engine equipped with a variable-displacement turbocharger and an exhaust-gas recirculation system, which is capable of providing a proper turbo-charging performance irrespective of in a transient operating state or in a steady operating state, by controlling the variable-displacement turbocharger in correlation with EGR control.

In order to accomplish the aforementioned and other objects of the present invention, a turbocharger control system for a turbocharged internal combustion engine equipped with an exhaust-gas recirculation control system recycling part of inert exhaust gas back through the engine under predetermined operating conditions of the engine, comprises a variable-displacement turbocharger variably adjusting a turbo-charging state, and a turbocharger control unit correcting a controlled quantity of the variable-displacement turbocharger in response to correction made to a desired EGR rate for the exhaust-gas recirculation control system.

According to another aspect of the invention, a turbocharger control system for a turbocharged internal combustion engine equipped with an exhaust-gas recirculation control system recycling part of inert exhaust gas back through the engine under predetermined operating conditions of the engine, comprises a variable-displacement turbocharger variably adjusting a turbo-charging state, sensors detecting operating conditions of the engine, a turbocharger control unit configured to be electronically connected to the sensors and the variable-displacement turbocharger for automatically regulating the turbo-charging state, the turbocharger control unit comprising a desired EGR rate arithmetic-calculation section arithmetically calculating a desired EGR rate as a function of a first predetermined engine operating condition of the operating conditions detected by the sensors, a desired turbo-charging controlled quantity arithmetic-calculation section arithmetically calculating a desired turbo-charging controlled quantity of the variable-displacement turbocharger as a function of the first predetermined engine operating condition, a desired EGR-rate correction section correcting the desired EGR rate, and a desired turbo-charging controlled quantity correction section correcting the desired turbo-charging controlled quantity in response to correction made to the desired EGR rate by the desired EGR-rate correction section.

According a further aspect of the invention, a method for controlling a variable-displacement turbocharger employed in an internal combustion engine, wherein the engine includes an exhaust-gas recirculation control system recycling part of inert exhaust gas back through the engine and having sensors detecting operating conditions of the engine, and an electronic control unit configured to be electronically connected to the sensors and the variable-displacement turbocharger for automatically regulating a turbo-charging state of the variable-displacement turbocharger, the method comprises correcting a controlled quantity of the variable-displacement turbocharger in response to correction made to a desired EGR rate for the exhaust-gas recirculation control system.

According to a still further aspect of the invention, a method for controlling a variable-displacement turbocharger employed in an internal combustion engine, wherein the engine includes an exhaust-gas recirculation control system recycling part of inert exhaust gas back through the engine and having sensors detecting operating conditions of the engine, an air-flow meter detecting an actual intake-air flow rate, and an electronic control unit configured to be electronically connected to the sensors, the air-flow meter and the variable-displacement turbocharger for automatically regulating a turbo-charging state of the variable-displacement turbocharger, the method comprising arithmetically calculating a desired EGR rate as a function of a first predetermined engine operating condition of the operating conditions detected by the sensors, arithmetically calculating a desired turbo-charging controlled quantity of the variable-displacement turbocharger as a function of the first predetermined engine operating condition, correcting the desired EGR rate, correcting the desired turbo-charging controlled quantity in response to correction made to the desired EGR rate, the correction, which is made to the desired turbo-charging controlled quantity in response to the correction made to the desired EGR rate, is executed as a correcting action made to a feedforward controlled quantity, estimating a desired value of the turbo-charging state, arithmetically calculating a feedback correction value by comparing the desired value of the turbo-charging state with the actual intake-air flow rate, executing feedback correction with respect to the feedforward controlled quantity, using the feedback correction value (DUTS) under a predetermined operating condition of the engine.

BRIEF DESCRIPTION OF THE DRAWINGS

FIG. 8 is a schematic operational block diagram explaining the function and construction of the turbocharger control system and the EGR control system in the invention.

DESCRIPTION OF THE PREFERRED EMBODIMENTS

Figure 1:
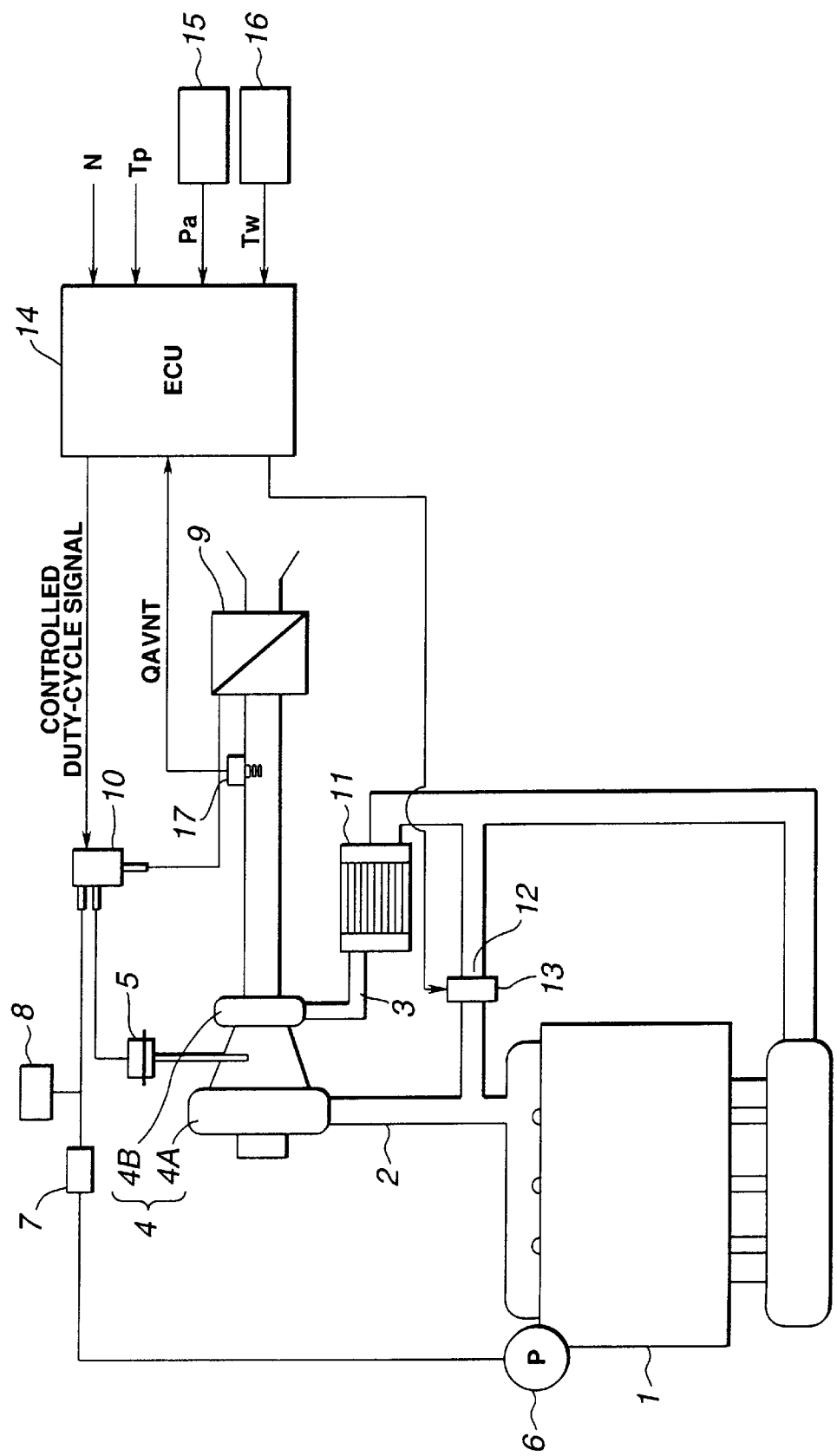
FIG. 1 is a system diagram illustrating one embodiment of a turbocharger control system of the invention.

Referring now to the drawings, particularly to FIG. 1, the turbocharger control system of the invention is exemplified in a turbocharged and intercooled diesel engine with a variable nozzle turbocharger (or a variable displacement turbocharger) and an exhaust-gas recirculation (EGR) control system. The diesel engine 1 is electronically connected to an electronic concentrated engine control system (ECCS) or an electronic engine control unit (ECU) being capable of monitoring various engine/vehicle parameters through a number of engine/vehicle sensors, to control various systems and devices, for example an electronic fuel injection control system, an electronic ignition system, the EGR control system and the variable displacement turbocharger, and to ensure that the exhaust emissions and fuel economy standards are maintained. As shown in FIG. 1, reference sign 4 denotes a variable displacement turbocharger, often called a "variable nozzle turbocharger". The variable displacement turbocharger 4 comprises a movable-vane turbine 4A having a plurality of movable turbine blades or vanes and a compressor pump 4B, to variably adjust its turbo-charging state. The turbine 4A is disposed in an exhaust gas passage, so that the turbine wheel is spun by the exhaust gas, whereas the compressor pump 4B is disposed in an air-intake passage (or an induction passage) 3. The turbine wheel is the same shaft as the compressor-pump rotor, and so the compressor pump is driven in synchronization with rotation of the turbine wheel so as to produce a high pressure on fresh air which is introduced through an air cleaner 9 into the intake passage 3. The super-charged air is directed into an intercooler 11 so as to aftercool the super-charged air and thus enhance air density. The variable nozzle turbocharger 4 has a plurality of movable turbine blades or vanes for variably throttling or restricting the inlet opening area or the inlet opening size of the turbine 4A. In order to increase or decrease boost pressure, the fluid-flow throttling degree or the fluid-flow restricting degree of each movable turbine vane is adjusted by means of an actuator 5 linked to the turbine vanes. Actually, the movable-turbine-vane actuator permits each vane angle to be varied such that the exhaust gas strikes the turbine vanes or blades at a designated angle and velocity suited to each engine speed range. In the shown embodiment, the actuator 5 comprises a diaphragm type vacuum-operated actuator. Although it is not clearly shown, the vacuum-operated actuator 5 consists of a diaphragm unit, a diaphragm chamber, and an operating rod mechanically linked to the movable turbine vanes. The stroke of the operating rod is controlled by way of a controlled vacuum applied to the diaphragm chamber. The vacuum is produced by a vacuum pump 6, which is located near the engine cylinder block, and delivered through a vacuum line or a vacuum tube (not numbered) via a one-way check valve 7 to a vacuum reservoir 8, and thus temporarily stored in the reservoir 8. The vacuum stored in the reservoir 8 is delivered to a duty-cycle controlled electromagnetic solenoid valve 10. The diaphragm chamber has a signal port or a controlled vacuum port connected to an outlet port of the duty-cycle controlled electromagnetic solenoid valve 10, to introduce the controlled vacuum into the diaphragm chamber of the vacuum-operated actuator 5. As can be appreciated from the connection line between the duty-cycle controlled valve 10 and the air cleaner 9, the duty-cycle controlled valve 10 has an atmospheric-pressure inlet port, such that the atmospheric-pressure inlet port (an air bleed) is cyclically opened and closed according to a controlled duty cycle or a controlled duty factor which is determined by the ECU 14. The duty-cycle controlled valve 10 is provided to suitably dilute the incoming vacuum with the atmosphere. Thus, air of partial vacuum (the negative pressure) in the pressure chamber of the duty-cycle controlled valve 10 is properly mixed with the atmosphere of a normal pressure, and thus the out-going vacuum (the controlled negative gauge pressure) from the duty-cycle controlled valve 10 can be properly regulated at a pressure level somewhat higher than the incoming vacuum. The lower a reading of vacuum in the diaphragm chamber of the vacuum-operated actuator 5, the greater the stroke of the operating rod of the actuator 5. Actually, as the controlled duty-cycle value of the pulse-width modulated signal (the control signal) applied to the duty-cycle controlled valve 10 increases, the rate of atmospheric pressure supply decreases. This increases the vacuum delivered to the diaphragm chamber of the actuator 5, and as a result the fluid-flow restricting degree of the movable turbine vanes of the turbine 4A is increased. In other words, the inlet opening area of the turbine 4A is reduced. As described above, the increased duty-cycle value of the PWM signal applied to the duty-cycle controlled valve 10 increases the fluid-flow restricting degree of the inlet side of the turbine, with the result that the exhaust-gas flow velocity increases and thus the boost pressure increases. Conversely, when the duty-cycle signal value output to the duty-cycle controlled valve 10 decreases, the rate of atmospheric-pressure supply increases. This decreases the vacuum delivered to the diaphragm chamber of the actuator 5, thus decreasing the fluid-flow restricting degree of the movable turbine vanes of the turbine 4A. As discussed above, the decreased duty-cycle signal value is utilized for increasing the opening of the inlet side of the movable-vane turbine 4A. The increased opening of the inlet side of the turbine 4A reduces the exhaust-gas flow velocity, thereby reducing the boost pressure. As seen in FIG. 1, the EGR control system of the embodiment includes an exhaust gas recirculation (abbreviated simply as "EGR") passage 12 which connects the air-intake passage 3 of the downstream side of the intercooler 11 with the exhaust-gas passage 2 of the engine 1. An EGR control valve device 13 is fluidly disposed in the middle of the EGR passage 12. The EGR control valve device 13 comprises an EGR control valve and an EGR-valve actuator. The EGR passage 12 and the EGR control valve device 13 are provided to send some of the exhaust gas back through the intake manifold or the intake passage 3 of the downstream side of the intercooler 11, thereby reducing the production of oxides of nitrogen ($NO_x$) at the exhaust system. The EGR-valve actuator of the EGR valve device 13 is connected to the EGR control valve so as to adjust the opening of the EGR control valve. The EGR-valve actuator usually comprises a stepper motor (also known as a "stepping motor" or a "step-servo motor"). The EGR-valve actuator (or the stepper motor) is connected via a signal line to the output interface or a drive circuit of the ECU 14, so that the angular steps or essentially uniform angular movements of the EGR-valve actuator can be obtained electromagnetically depending on a control signal or a drive signal which is output from the output interface of the ECU 14 and indicative of a desired opening of the EGR control valve. That is, the command value of the EGR-control-valve opening is arithmetically calculated as a desired number of angular steps of the step motor. By increasing the number of angular steps, the EGR control valve opening, simply the EGR valve opening, can be controlled-substantially continually from the full-open position to the fully-closed position. Although it is not shown in FIG. 1, in a conventional manner, a throttle valve (not shown) is disposed in the air-intake passage 3 usually upstream of the confluent point between the outlet port of the EGR passage 12 and the air-intake passage 3. The throttle valve is usually comprised of a butterfly valve. The opening and closing of the throttle valve can be electronically controlled in response to a control signal from the ECU 14. The throttle valve is operated between an open mode position and a closed mode position. Also, the EGR control valve 13 and the electronically-controlled throttle valve (not shown) cooperate with each other to properly regulate the quantity of exhaust gas recirculated so that the amount of $NO_x$ is reduced at various engine operating conditions, such as at high loads, at low speeds, during starting and warming up from cold, or in a transient state (in presence of environmental variation) from low-land driving to high-land driving. For example, under a certain engine operating condition where a large amount of EGR is required, the throttle valve is shifted to a valve position as close to its closed position as possible in order to produce a negative pressure in the air-intake pipe downstream of the throttle valve, whereas the EGR control valve is regulated or adjusted to a desired EGR control valve opening based on the certain engine operating condition. Conversely, when less EGR is required or there is no necessity for EGR, the throttle valve is shifted to its full-open position corresponding to the open mode position. With the throttle valve maintained at the closed mode position, the differential pressure between a pressure in the exhaust system (simply an exhaust pressure) and a pressure in the induction system including the intake manifold and the collector is enlarged to the maximum, thereby facilitating recirculation of the exhaust gas. Details of the electronic control unit (ECU) 14 are described hereunder.

As appreciated from the system diagram shown in FIG. 1, the ECU 14 comprises a microcomputer containing a memory (ROM, RAM), an input/output interface (or input interface circuitry and output interface circuitry), and a central processing unit (CPU). The memory is generally designed to store informational data from the input and output interfaces, preprogrammed characteristic map data, and the results of ongoing arithmetic calculations. The input/output interface is the device that allows data to be transferred between input and output devices, CPU and the memory. Output signals from the input/output interface are amplified to operate electrical loads, namely the EGR-valve actuator. Arithmetic and logic sections of the CPU perform necessary arithmetic calculations shown in FIGS. 3 through 7. The output interface of the ECU 14 is connected to the throttle-valve actuator (not shown), the EGR-valve actuator, and the duty-cycle controlled valve 10 for the variable nozzle turbocharger 4. On the other hand, the input interface of the ECU 14 is connected to various engine/vehicle sensors, for receiving an engine-speed indicative signal N, a basic fuel-injection amount indicative signal Tp (regarded as an engine-load equivalent value), an atmospheric-pressure indicative signal Pa from an atmospheric-pressure sensor (serving as an air-density sensor) 15, an engine temperature indicative signal Tw from an engine coolant temperature sensor (a water temperature sensor) 16, and an actual intake-air flow rate indicative signal QAVNT from an air-flow meter 17. In the embodiment, although the atmospheric-pressure sensor 15 is used to detect a change in air density (changes in environment), an intake-air temperature sensor may be combined with the atmospheric-pressure sensor to more precisely detect changes in environment. The air-flow meter 17 comprises a hot-wire mass air flow meter which is located in the air-intake passage just downstream of the air cleaner 9. The air-flow meter 17 is provided for detecting an actual flow rate QAVNT of fresh air passing through the air cleaner. The engine speed data N and the basic fuel-injection amount indicative input information data Tp (regarded as a representative value of engine load) are generally used as fundamental engine operating parameters needed for determining the fuel-injection amount and fuel-injection timing. As described later, the input information data N and Tp are also used for determination of a basic desired intake-air flow rate (QCSSP1), a desired EGR rate (MEGRM), correction or compensation for the desired EGR rate (MEGRM), and correction or compensation for the basic desired intake-air flow rate (QCSSP1), that is, determination and correction of the controlled duty-cycle signal value of the duty-cycle controlled valve 10 (in other words, the controlled quantity of the fluid-flow restricting degree of the variable nozzle turbocharger 4). The atmospheric-pressure indicative signal Pa from the sensor 15 is used to correct the controlled quantity of the fluid-flow restricting degree of the variable nozzle turbocharger 4. The engine temperature indicative signal Tw from the sensor 16 is used to correct the desired EGR rate. The actual intake-air flow rate indicative signal QAVNT from the air-flow meter 17 is used for feedback control for the intake-air flow rate (containing a turbo-charging state).

Figure 2:
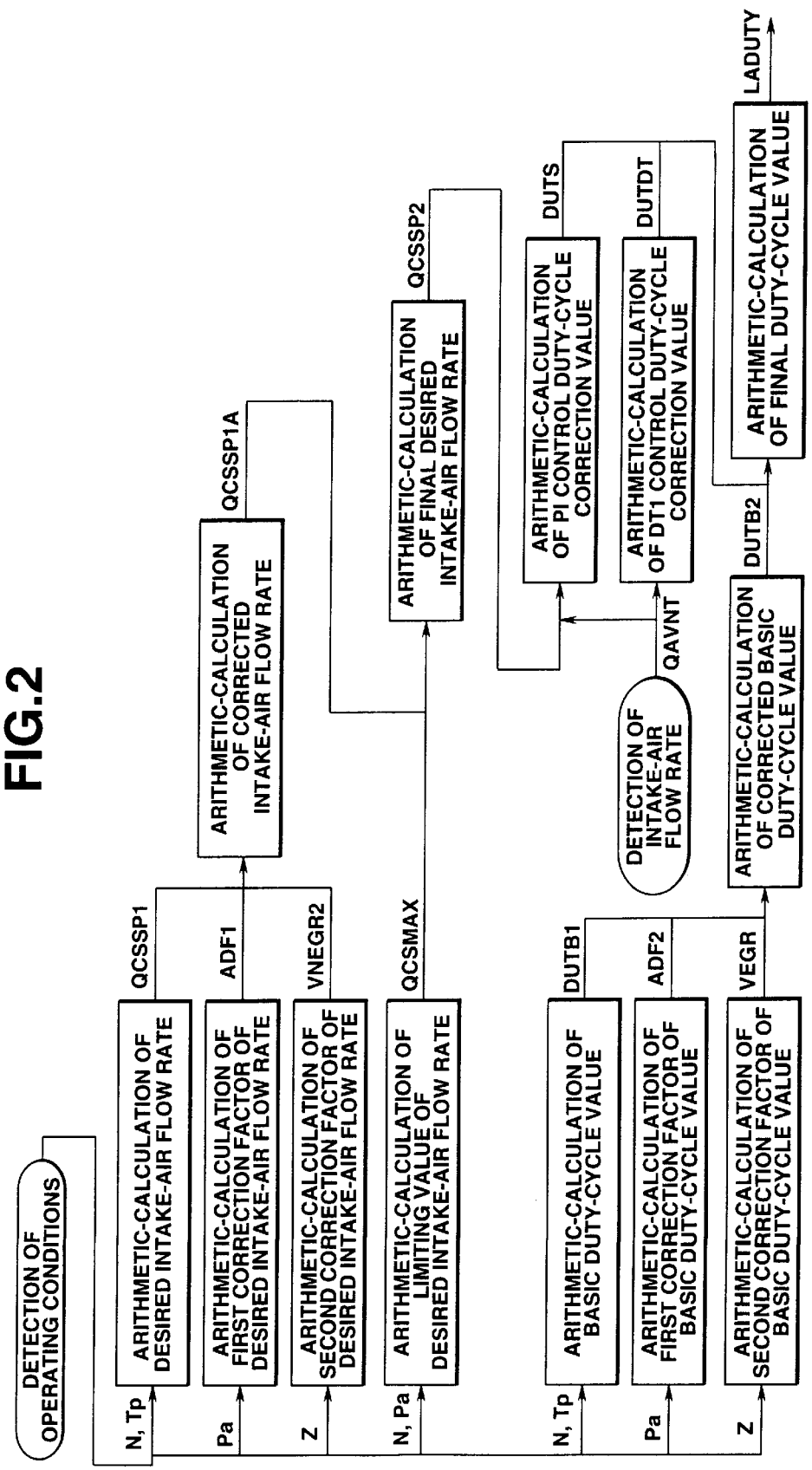
FIG. 2 is a block diagram illustrating control and signal data flow during the automatic variable-nozzle turbocharger control of the embodiment.

Referring now to FIG. 2, there is shown the block diagram illustrating the fundamental control and signal data flow of the variable-nozzle turbocharger control of the embodiment. Briefly speaking, a basic duty-cycle value DUTB1 (serving as a feed-forward controlled quantity) of the duty-cycle controlled valve 10 is arithmetically calculated. Additionally, a final desired intake-air flow rate QCSSP2 or a basic desired intake-air flow rate QCSSP1 is arithmetically calculated or estimated and also an actual intake-air flow rate QAVNT is detected or measured by means of the air-flow meter 17. In a feedback-control inhibition zone or region (Tp≦Tm) where feedback control is inhibited, the inlet opening area of the turbine 4A of the variable nozzle turbocharger 4 is subjected to open-loop control (or feed-forward control) according to which the duty-cycle value of the duty-cycle controlled valve 10 of the variable nozzle turbocharger 4 is based on the feedforward controlled quantity DUTB1 (or the corrected basic duty-cycle value DUTB 2). Within a feedback-control permission zone (simply a feedback-control zone) (Tp>Tm) where feedback control is permitted, first, a feedback correction value DUTS is arithmetically calculated by comparison (QCSSP2−QAVNT) between the final desired intake-air flow rate QCSSP2 and the actual intake-air flow rate QAVNT, and then the feedback control is executed on the basis of both the feedforward controlled quantity DUTB1 and the feedback correction value DUTS. In order to enhance the accuracy of the variable nozzle turbocharger control, a first correcting operation (ADF1; ADF2) based on changes in atmospheric pressure (Pa) and a second correcting operation or a transient correction (VNEGR2; VEGR) based on changes in the EGR rate are further utilized. In the embodiment, in due consideration of changes in the intake-air flow rate occurring owing to the EGR-rate correction (Z) made to a desired EGR rate, the previously-noted feedforward controlled quantity DUTB1 is properly corrected as the corrected feedforward controlled quantity (or the corrected basic duty-cycle value DUTB2=DUTB1×ADF2×VEGR), and additionally the basic desired intake-air flow rate QCSSP1 is properly corrected as the corrected intake-air flow rate QCSSP1A (=QCSSP1×ADF1×VNEGR2). Details of the operation of each of the blocks shown in FIG. 2 are described in detail in reference to the flow charts of FIGS. 3 through 7.

Figure 3:
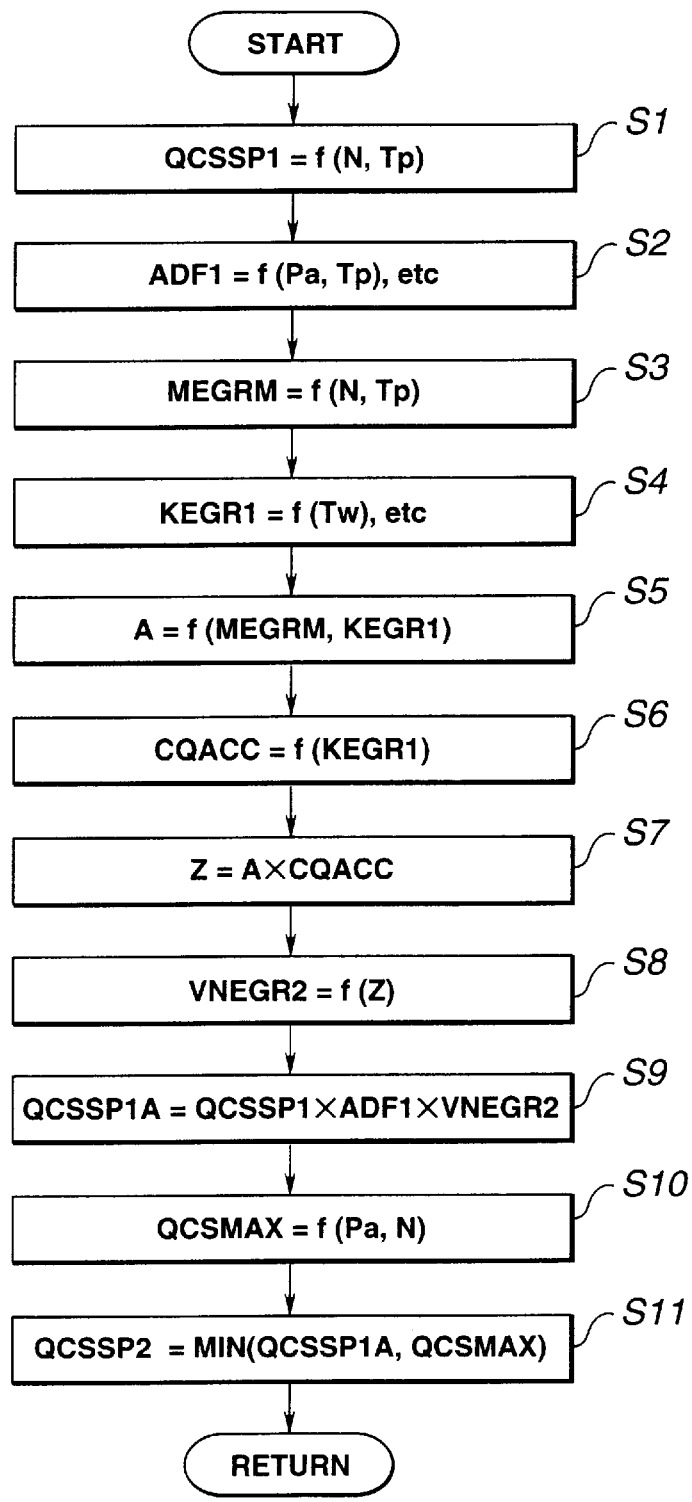
FIG. 3 is a flow chart illustrating arithmetic calculation of a final desired intake-air flow rate (QCSSP2), necessary for the turbocharger control.

Referring now to FIG. 3, there is shown the arithmetic-calculation routine for a desired intakeair flow rate (or a final intake-air flow rate QCSSP2). The routines shown in FIGS. 3–7 are cyclically executed as time-triggered interrupt routines to be triggered every predetermined intervals such as several milliseconds or several 10 milliseconds.

In step S1, a basic desired intake-air flow rate (simply, a desired intake-air flow rate) QCSSP1 is arithmetically calculated on the basis of the engine speed indicative data N and the engine load indicative data (i.e., the basic fuel-injection amount indicative data Tp) from a predetermined three-dimensional characteristic map illustrating the relationship among engine speed (N), engine load (Tp), and a basic desired intake-air flow rate (QCSSP1). The basic desired intake-air flow rate QCSSP1 is set or retrieved from the predetermined characteristic map, considering that EGR is performed at a desired EGR rate which is set at the same operating condition (the same engine speed and load) (see step S31 of FIG. 5). In step S2, an atmospheric-pressure-change dependent correction factor ADF1 for the basic desired intake-air flow rate QCSSP1 is retrieved on the basis of the atmospheric pressure indicative signal data Pa from the sensor 13 and the engine load indicative data Tp, from a predetermined characteristic map. There is a decrease in air density, arising from change in environment from low-land driving to high-land driving. The previously-noted atmospheric-pressure-change dependent correction factor ADF1 for the basic desired intake-air flow rate QCSSP1 will be referred to as a "first intake-air-quantity correction factor". The first intake-air-quantity correction factor ADF1 is required to compensate for an excessive rise in boost pressure at the high engine load range, which excessive boost-pressure rise may occur if the same desired intake-air flow rate (calculated during the low-land driving) remains kept constant. In step S3, a basic value (MEGRM) of the desired EGR rate (simply the basic EGR rate) is arithmetically calculated by way of retrieval from a preprogrammed three-dimensional characteristic map representative of the relationship among the engine speed N, the basic fuel-injection amount Tp (equivalent to the engine load), and the basic EGR rate MEGRM. In step S4, a first EGR-rate correction factor KEGR1, which is used for primarily correcting or compensating for the basic EGR rate (MEGRM) on the basis of a predetermined operating parameter (such as the engine coolant temperature Tw) except engine speed and load, is derived or retrieved as a function f(Tw) of the engine coolant temperature Tw from a predetermined or preprogrammed two-dimensional characteristic map. As is generally known, there is the problem of increased cylinder-wall wear occurring owing to carbon deposits adhered to the engine cylinder wall by exhaust gas flow recirculated particularly at low engine temperatures. Thus, the water temperature (Tw) versus first-EGRrate-correction-factor (KEGR1) characteristic map is designed to decrease the first correction factor KEGR1 as the water temperature Tw (regarded as the engine temperature) lowers, in such a manner as to set the first correction factor KEGR1 at a predetermined minimum value during the start of the engine from cold, and to gradually rise the first correction factor KEGR1 up to 1.0 according to the increase of the water temperature, and to set the first correction factor KEGR1 at the maximum value (i. e., 1.0) after the engine has been warmed up. In the shown embodiment, the first correction factor KEGR1 is defined as a coefficient with which the basic EGR rate MEGRM is multiplied, and thus the first correction factor KEGR1 is preprogrammed as a value less than or equal to "1". Also, in the shown embodiment, although the engine coolant temperature Tw is used as the predetermined operating parameter except engine speed and load, which parameter is needed for determining the first EGR-rate correction factor KEGR1, the other operating parameter such as fuel-injection timing, atmospheric pressure or the like may be used as the predetermined operating parameter except engine speed and load. The intake-air flow rate tends to vary owing to the EGR rate varied or primarily corrected or affected by the first EGR-rate correction factor KEGR1. Thus, in step S5, a basic intake-air flow rate correction factor A is arithmetically calculated as a rate of change in a basic intake air flow rate (precisely a basic induced fresh-air flow rate per cylinder) based on the engine speed (N) and load (Tp), under a particular condition where a totally-induced gas flow rate (the induced fresh-air flow rate plus quantity of exhaust gas recirculated) is kept constant. In the embodiment, the basic intake-air flow rate correction factor A is arithmetically calculated as a function f(MEGRM, KEGR1) on the basis of both the basic EGR rate MEGRM and the first EGR-rate correction factor KEGR1, from the following first expression (1) or the following second expression (2). When the EGR rate is defined as a ratio of the exhaust-gas-recirculation amount (EGR amount) to the intake-air flow rate (the induced fresh-air flow rate), the first expression (1) is used. When the EGR rate is defined as a ratio of the EGR amount (the quantity of exhaust gas recirculated) to the totally-induced gas flow rate (the induced fresh-air flow rate plus the EGR amount), the second expression (2) is used.

$$A=(1+MEGRM)/(KEGR1 \times MEGRM+1) \quad (1)$$

$$A=(1-KEGR1 \times MEGRM)/(1-MEGRM) \quad (2)$$

Actually, the totally-induced gas flow rate (defined as the sum of an induced fresh-air flow rate per cylinder and an EGR amount per cylinder) varies as the EGR rate varies due to the first EGR-rate correction factor KEGR1. However, the rate of change in the totally-induced gas flow rate has a generally regular or steady tendency with respect to the rate of change in the EGR rate under such an operating condition that EGR is being added or diverted into the engine at least without deterioration of combustion. Therefore, it is unnecessary to verify or determine as to how the totally-induced gas flow rate is affected by variations in the EGR rate all over the operating conditions of the engine. For the reasons set out above, a volumetric-efficiency correction factor CQACC can be determined on the basis of the tendencies of the rate of change in the totally-induced gas flow rate, occurring due to changes in the EGR rate under the specified operating condition that EGR is being added or diverted into the engine at least without deterioration of combustion. The volumetric-efficiency correction factor CQACC means a volumetric-efficiency dependent intake-air flow rate correction factor corresponding to a change in the volumetric efficiency, taking place owing to the EGR rate varied or primarily corrected by the first EGR-rate correction factor KEGR1. Thus, a characteristic map for the volumetric-efficiency dependent intake-air flow rate correction factor CQACC is preprogrammed in the form of a two-dimensional characteristic map utilizing only the first EGR-rate correction factor KEGR1 as a parameter. In other words, the volumetric-efficiency dependent intake-air flow rate correction factor CQACC is represented as a function f(KEGR1) of the first EGR-rate correction factor KEGR1. Actually, in step S6, the previously-discussed volumetric-efficiency correction factor CQACC is retrieved from the preprogrammed two-dimensional characteristic map, on the basis of the first EGR-rate correction factor KEGR1 obtained through step S4. In step S7, a composite correction factor Z for the basic desired intake-air flow rate QCSSP1 is computed or calculated by the following expression (3).

$$Z=A \times CQACC \quad (3)$$

where A denotes the basic intake-air flow rate correction factor A, and CQACC denotes the volumetric-efficiency dependent intake-air flow rate correction factor.

As seen in the expression (3), the final intake-air flow rate correction factor Z is defined as the product of the two correction factors A and CQACC. In step S8, a second intake-air-quantity correction factor VNEGR2 for the desired intake-air flow rate QCSSP1 is arithmetically calculated as a function f(Z) of the composite intake-air flow rate correction factor Z. In step S9, the basic desired intake-air flow rate QCSSP1 is corrected on the basis of both the first intake-air-quantity correction factor ADF1 and the second intake-air-quantity correction factor VNEGR2 in accordance with the following expression (4), so as to obtain a corrected intake-air flow rate QCSSP1A.

$$QCSSP1A = QCSSP1 \times ADF1 \times VNEGR2 \quad (4)$$

In step S10, a limiting value QCSMAX of the desired intake-air flow rate is arithmetically calculated on the basis of both the atmospheric-pressure indicative signal data Pa and the engine speed data N, from a predetermined or preprogrammed characteristic map. The limiting value QCSMAX is necessary to limit or avoid excessive rise in the rotational speed of the turbocharger 4, owing to a decrease in the differential pressure between inlet pressure and outlet pressure of the turbine 4A. The decrease in the differential pressure takes place due to a drop in atmospheric pressure Pa during high-land driving. In step S11, the magnitude of the corrected intake-air flow rate QCSSP1A is limited by the limiting value QCSMAX, so that a smaller one of the corrected intake-air flow rate QCSSP1A and the limiting value QCSMAX is selected through a so-called select-LOW process MIN(QCSSP1A, QCSMAX).

Figure 4:
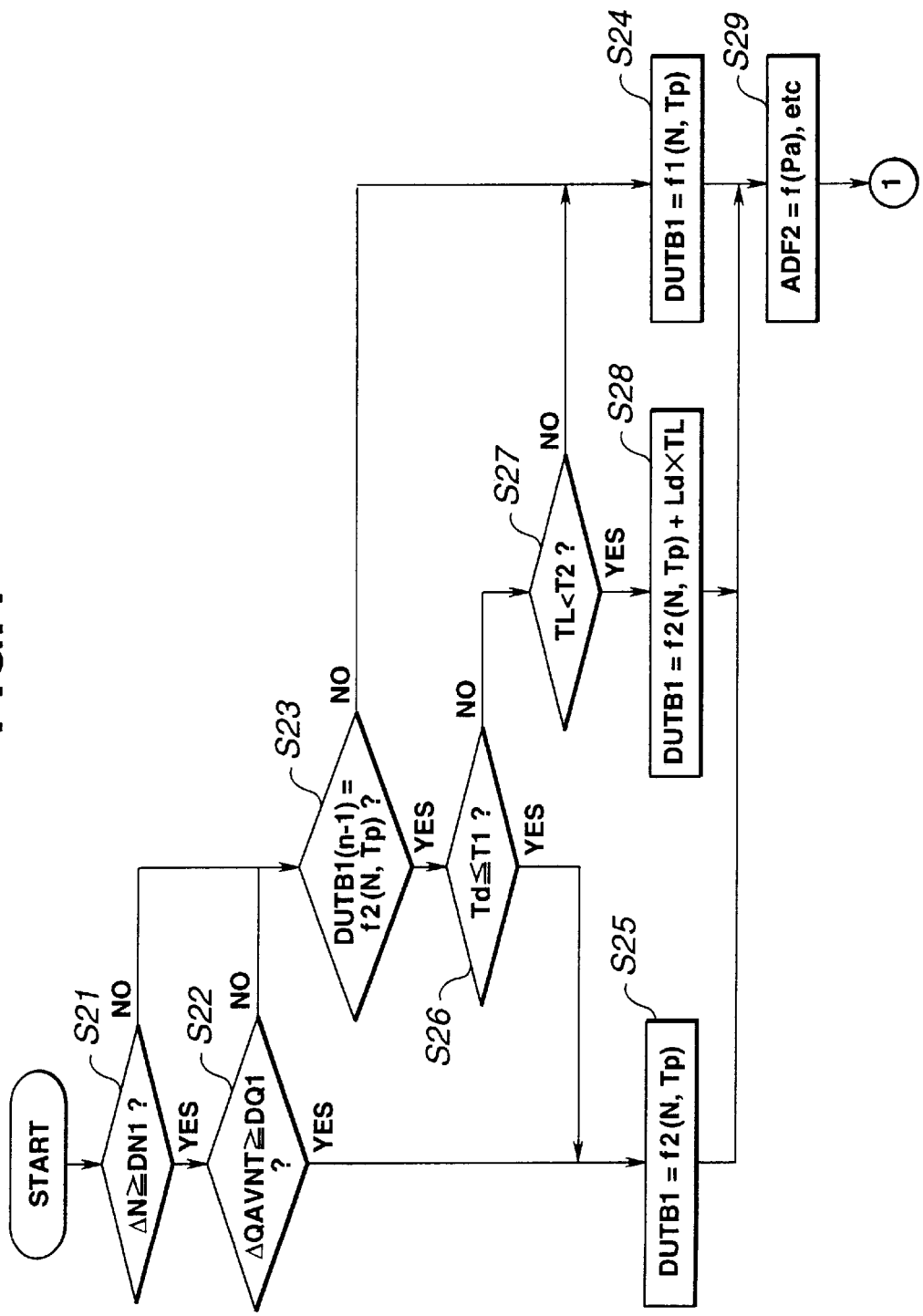
FIG. 4 shows a former stage of an arithmetic-calculation routine for a basic duty-cycle value necessary to control the inlet opening of a movablevane turbine of a variable nozzle turbocharger electronically connected to an electronic control unit (ECU) shown in FIG. 1.
Figure 5:
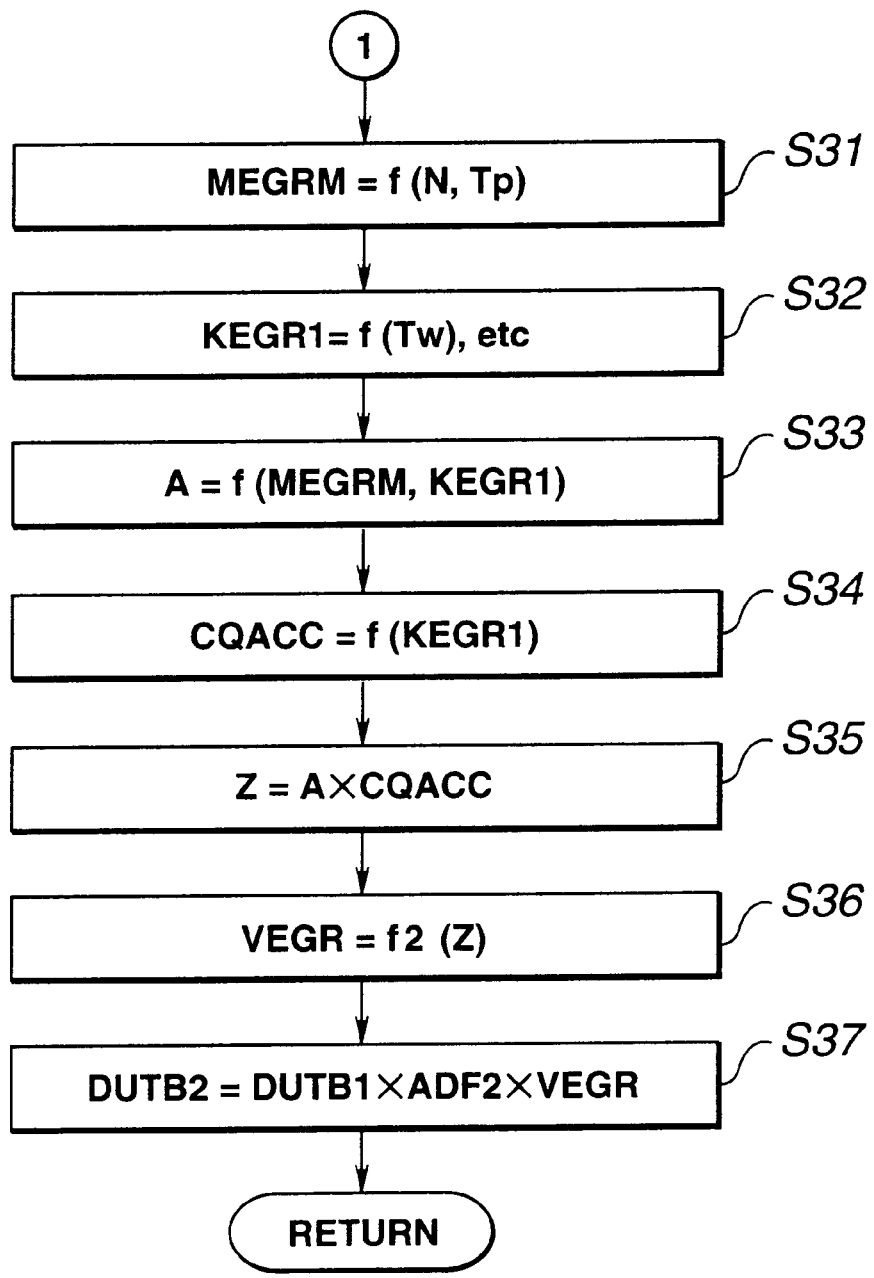
FIG. 5 is a latter stage of the arithmetic-calculation routine for the basic duty-cycle value, following the flow chart shown in FIG. 4.

Referring now to FIGS. 4 through 7, there are shown a series of arithmetic calculations for computing a final duty-cycle value (LADUTY) of the pulsewidth modulated signal necessary to control the inlet opening of the movable-vane turbine 4A of the variable nozzle turbocharger 4. FIGS. 4 and 5 show the arithmetic-calculation routine used to compute a basic duty-cycle value (DUTB1) and its corrected value (DUTB2).

In step S21, a test is made to determine whether a time rate ($\Delta N = N_{new} - N_{old}$) of change of the engine speed N (in a direction increasing the engine speed N) is greater than or equal to a predetermined threshold value DN1. $N_{new}$ denotes the latest up-to-date input information data $N_{(n)}$ of the engine speed indicative signal N, whereas $N_{old}$ denotes the input information data $N_{(n-1)}$ of the engine speed indicative signal N extracted one cycle before. In step S22, a test is made to determine whether a time rate of change ($\Delta QAVNT = QAVNT_{new} - QAVNT_{old}$) of the actual intake-air flow rate QAVNT (in a direction increasing the actual intake-air flow rate QAVNT) is greater than or equal to a predetermined threshold value DQ1. $QAVNT_{new}$ denotes the latest up-to-date input information data $QAVNT_{(n)}$ of the actual intake-air flow rate indicative signal QAVNT, whereas $QAVNT_{old}$ denotes the input information data $QAVNT_{(n-1)}$ of the actual intake-air flow rate indicative signal QAVNT extracted one cycle before. That is, the suffix "(n)" or "new" indicates the current value extracted through the current routine, whereas the suffix "(n-1)" or "old" indicates the previous value extracted through the previous routine. When the answer to step S21 is in the negative (NO) or when the answer to step S22 is in the negative (NO), step S23 occurs. In step S23, a test is made to determine whether or not the previous value $DUTB1_{(n-1)}$ of the basic desired duty-cycle value DUTB1 of the duty-cycle controlled valve 10 is arithmetically calculated as a function f2(N, Tp). Actually, just after the arithmetic calculation initiates, the previous basic duty-cycle value $DUTB1_{(n-1)}$ does not yet exist, and thus the routine flows from step S23 to step S24. In step S24, the basic duty-cycle value DUTB1 of the valve 10 is arithmetically calculated as a first predetermined function f1(N, Tp) of the engine speed N and the engine load Tp (the basic fuel-injection amount) from a predetermined or preprogrammed characteristic map illustrating the relationship among engine speed (N), engine load (Tp), and a basic duty-cycle value (DUTB1). When the answer to step S21 is in the affirmative (YES) and the answer to step S22 is in the affirmative (YES), that is when the rate-of-increase ΔN in the engine speed and the rate-of-increase ΔQAVNT in the actual intake-air flow rate are both great and thus there is an increased tendency of excessive boost pressure, step S25 occurs. In step S25, the basic duty-cycle value DUTB1 is arithmetically calculated as a second predetermined function f2(N, Tp) of the engine speed N and the engine load Tp (the basic fuel-injection amount) from a predetermined or preprogrammed characteristic map illustrating the relationship among engine speed (N), engine load (Tp), and a basic duty-cycle value (DUTB1). Note that a value of the second predetermined function f2(N, Tp) is preset or preprogrammed to be less than a value of the first predetermined function f1(N, Tp) under the same operating condition, that is, in the same engine speed and load range (N, Tp). By way of the flow from step S21 through step S22 to step S25, the controlled quantity of the fluid-flow throttling degree of the movable-vane turbine 4A of the variable nozzle turbocharger 4 is decreased, in other words, the inlet opening of the movable-vane turbine 4A is increased. As a result, the rise in rotational speed of the turbine 4A is suppressed, thereby suppressing the rise in boost pressure. Under this condition, when at least one of the conditions defined in steps S21 and S22 is unsatisfied, that is, in case that the condition ΔN<DN1 becomes satisfied or in case that the condition ΔQAVANT<DQ1 becomes satisfied, the routine flows to step S23. At this time, the routine proceeds to step S26, because the basic duty-cycle value DUTB1 has already been calculated as the second function f2(N, Tp) at step S25. In step S26, a check is made to determine whether a first elapsed time Td reaches a predetermined delay time T1. The first elapsed time Td is counted or measured from a time when at least one of the conditions of steps S21 and S22 after the basic duty-cycle value DUTB1 has been updated as the second function f2(N, Tp) at step S25. When the answer to step S26 is affirmative (YES), that is, when the first elapsed time Td does not reach the predetermined delay time T1 (in case of Td<T1), the routine proceeds from step S26 to step S25. Therefore, the flow from step S26 to step S25 is repeated until the first elapsed time Td reaches the predetermined delay time T1 (until the condition Td>T1 is satisfied). As a result, the basic duty-cycle value DUTB1 is repeatedly calculated or computed as the second function f2(N, Tp) for the predetermined delay time T1. Thereafter, as soon as the first elapsed time Td reaches the predetermined delay time T1, step S27 occurs. In step S27, a second elapsed time TL is counted or measured from a time when the condition Td≦T1 becomes unsatisfied at step S26 (i.e., when the condition Td>T1 becomes satisfied at step S26). Furthermore, in step S27, the second elapsed time TL is compared with a predetermined ramp time T2, that is, a check is made to determine whether the second elapsed time TL is less than the predetermined ramp time T2. When the predetermined ramp time T2 is not reached, that is, when the condition TL<T2 is satisfied, the routine proceeds from step S27 to step S28. In step S28, the basic duty-cycle value DUTB1 is arithmetically calculated from the following expression (5)

$$DUTB1 = f2(N, Tp) + Ld \times TL \quad (5)$$

where f2(N, Tp) corresponds to the predetermined second function, Ld denotes a ramp coefficient (a predetermined positive value).

As can be appreciated from the second term (Ld×TL) of the right-hand side of the expression (5), the sum of the second function f2(N, Tp) and the product (Ld×TL) of the ramp coefficient Ld and the second elapsed time TL gradually increases, as the second elapsed time TL increases. The ramp coefficient is predetermined or preprogrammed, so that the basic duty-cycle value (DUTB1), which is obtained as the sum {f2(N, Tp)+Ld×TL} of the second function f2(N, Tp) and the product (Ld×TL), gradually increases at a predetermined time rate of increase defined by the ramp coefficient Ld, and then approaches to a value of the predetermined first function f1(N, Tp), obtained from the expression DUTB1=f1(N, Tp) in the same engine and load range. In step S27, as soon as the second elapsed time TL reaches the predetermined ramp time T2, the routine flows from step S27 to step S24 where the basic duty-cycle value DUTB1 is arithmetically calculated as the first predetermined function f1(N, Tp). Under steady operating conditions or in a steady operating state (see the flow from step S21 or S22 via step S23 to step S24), the basic duty-cycle value DUTB1 is set at the first predetermined function f1(N, Tp). Conversely, under transient operating conditions or in a transient operating state (see the flow from step S21 through step S22 to step S25) where there is the increased tendency of the rise in boost pressure, the basic duty-cycle value DUTB1 is set at the second predetermined function f2(N, Tp). The setting of the basic duty-cycle value DUTB1 at the second function f2(N, Td) is maintained for the predetermined delay time T1 after the operating condition becomes out of the transient operating state. Thereafter, the basic duty-cycle value DUTB1 gradually increases from the value of the second function f2(N, Td) to the value of the first function f1(N, Td) by the predetermined time rate of increase defined by the ramp coefficient Ld. That is to say, for the predetermined ramp time T2, the basic duty-cycle value DUTB1 is recovered from the smaller value of the second function f2(N, Tp) to the larger value of the first function f1(N, Tp). Thus, in the transient state, the basic duty-cycle value DUTB1 of the duty-cycle controlled valve or the variable-nozzle-turbocharger (VNT) control valve 10 can be rapidly effectively set at a comparatively small duty-cycle value defined by the second function f2(N, Tp). On the other hand, the recovery of the basic duty-cycle value DUTB1 from the comparatively small duty-cycle value of the second function f2(N, Tp) to the comparatively large duty-cycle value of the first function f1(N, Tp) is gradually performed by the provision of the predetermined delay time T1 and the predetermined ramp time T2. This avoid undesired system hunting. In this manner, the arithmetic processing for the basic duty-cycle value DUTB1 of the variable-nozzle-turbocharger control valve 10 is executed. Then, in step S29, an atmospheric-pressure-change dependent correction factor ADF2 for the basic duty-cycle value DUTB1 is retrieved on the basis of the atmospheric pressure indicative signal data Pa, from a predetermined two-dimensional characteristic map. Alternatively, the correction factor ADF2 may be retrieved on the basis of the atmospheric pressure indicative signal data Pa and the engine load indicative data Tp, from a predetermined three-dimensional characteristic map in the same manner as the first intake-air-quantity correction factor ADF1 (see step S2). The previously-noted atmospheric-pressure-change dependent correction factor ADF2 for the basic duty-cycle value DUTB1 will be referred to as a "first basic duty-cycle value correction factor". For the same reasons as set forth with regard to the use of the first intake-air-quantity correction factor ADF1 in step S2 of FIG. 3, the first basic duty-cycle value correction factor ADF2 is necessary to compensate for an excessive rise in boost pressure arising from the lowered air density during high-land driving, and to correct effectively the basic duty-cycle value DUTB1 serving as the feedforward controlled quantity for the fluid-flow restricting degree of the movable-vane turbine 4A of the variable nozzle turbocharger 4 (see the expression indicated in step S37 of FIG. 5).

Referring to FIG. 5, there is shown a series of arithmetic calculations necessary for correcting the basic duty-cycle value DUTB1 (the feedforward controlled quantity for the fluid-flow restricting degree of the movable-vane turbine 4A) in due consideration of changes in the intake-air flow rate, occurring owing to changes in the desired EGR rate MEGRM. In the same manner as steps S3–S7 (part of the arithmetic-calculation routine of the desired intake-air flow rate shown in FIG. 3), in steps S31–S35 (part of the arithmetic-calculation of the corrected basic duty-cycle value DUTB2 shown in FIG. 5), the desired EGR rate MEGRM, the first EGR-rate correction factor KEGR1, the basic intake-air flow rate correction factor A, the volumetric-efficiency dependent intake-air flow rate correction factor CQACC, and the composite intake-air flow rate correction factor Z are arithmetically calculated through steps S31, S32, S33, S34, and S35, in that order. In step S36, a second basic duty-cycle value correction factor VEGR for the basic duty-cycle value DUTB1 is arithmetically calculated as a function f2(Z) of the composite intake-air flow rate correction factor Z. In step S37, the basic duty-cycle value DUTB1 is corrected on the basis of both the first basic duty-cycle value correction factor ADF2 and the second basic duty-cycle value correction factor VEGR in accordance with the following expression (6), so as to obtain the corrected basic duty-cycle value DUTB2.

$$DUTB2 = DUTB1 \times ADF2 \times VEGR \quad (6)$$

Figure 6:
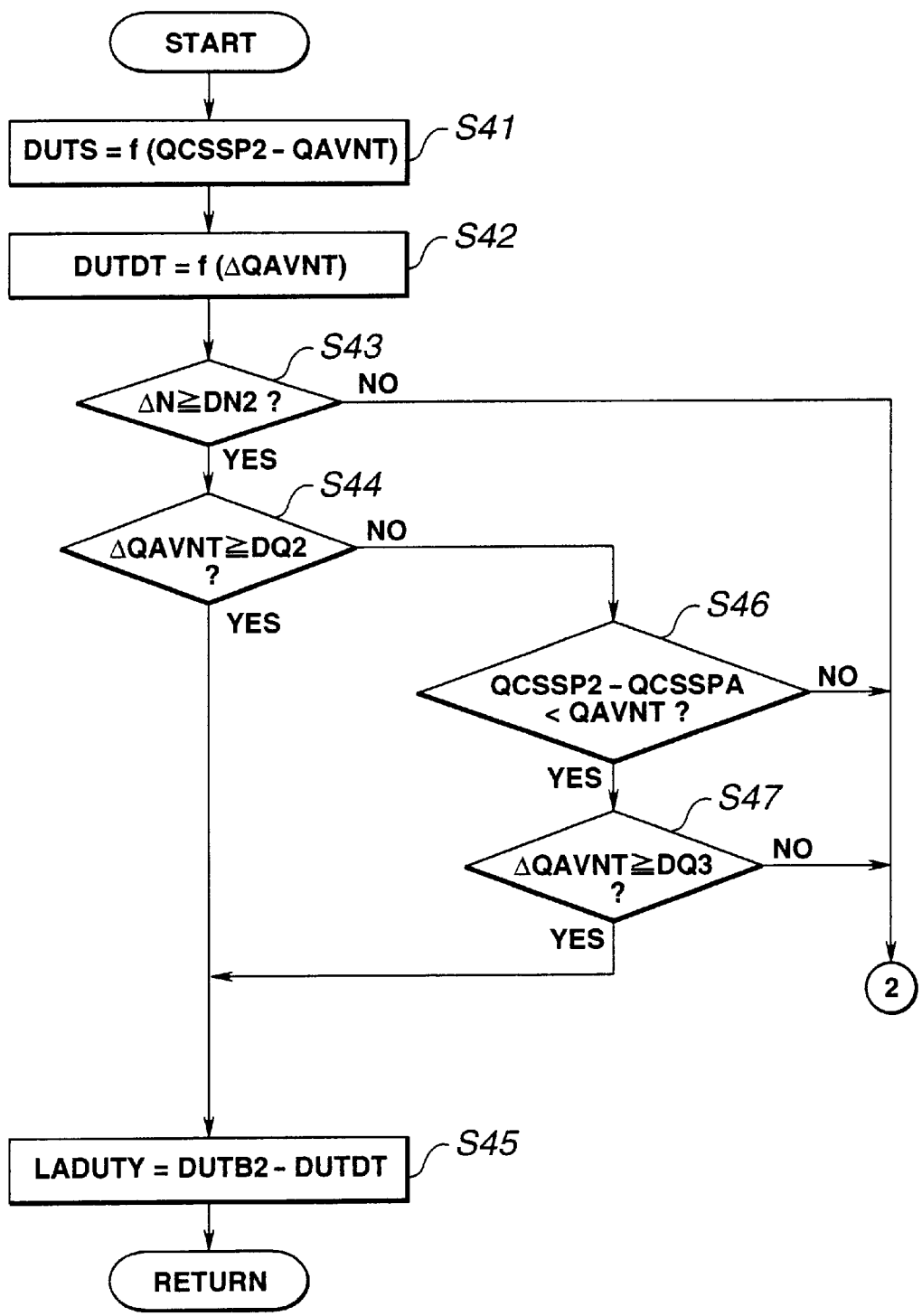
FIG. 6 is a former stage of an arithmetic-calculation routine for a final duty-cycle value (LADUTY) output from the ECU.
Figure 7:
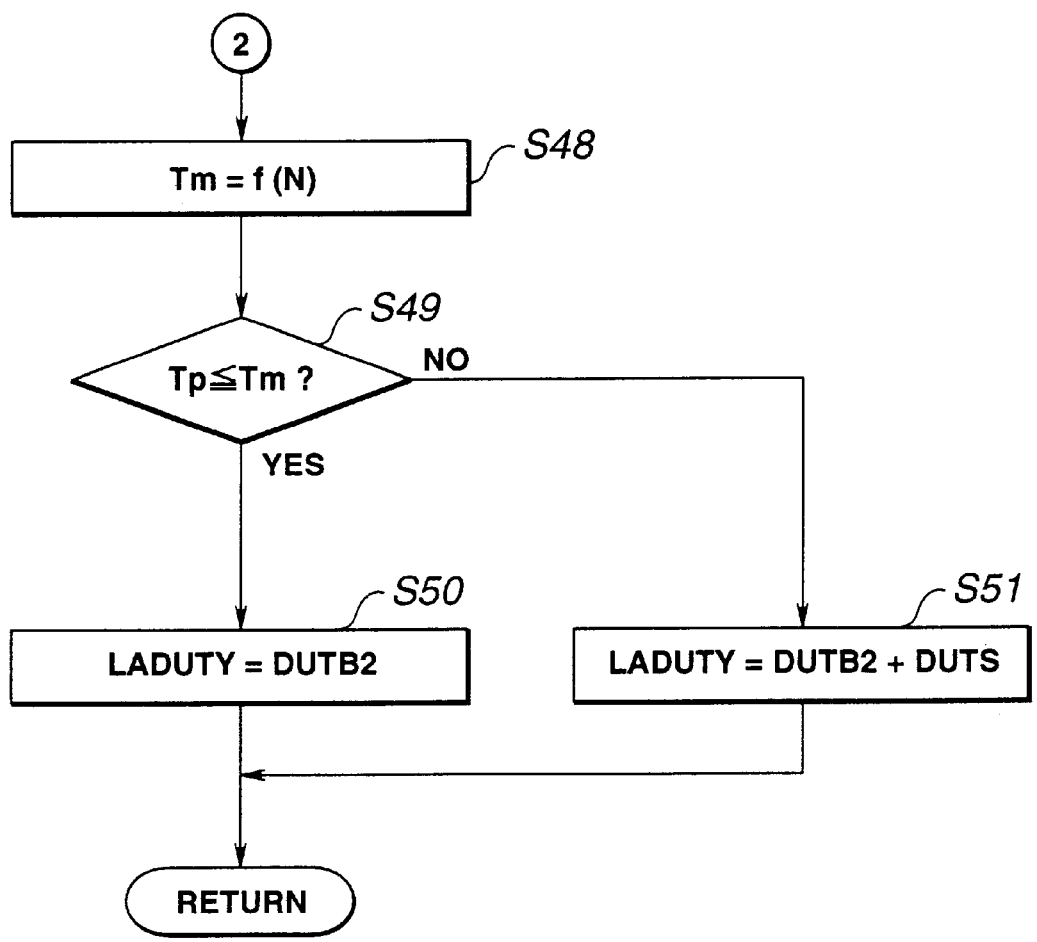
FIG. 7 is a latter stage of the arithmetic-calculation routine for the final duty-cycle value (LADUTY).

Referring now to FIGS. 6 and 7, there is shown the arithmetic-calculation routine used to compute a final duty-cycle value (LADUTY) on the basis of the corrected duty-cycle value (DUTB2).

In step S41, a feedback correction value DUTS for the corrected duty-cycle value DUTB2 is arithmetically calculated as a function f(QCSSP2−QAVNT) of the deviation (QCSSP2−QAVNT) of the final desired intake-air flow rate QCSSP2 from the actual intake-air flow rate QAVNT. The feedback correction value DUTS corresponds to a correction value of the duty-cycle value of the PWM signal applied to the duty-cycle controlled valve (the variable-nozzle-turbocharger (VNT) control valve 10) in a variable-nozzle-turbocharger closed-loop feedback control system in which the output control signal is a linear combination of an error signal (a proportional term) and its integral (an integrating term). For this reason, the feedback correction value DUTS will be referred to as a "PI-control duty-cycle correction value". Note that the feedback correction value DUTS is used to further correct the corrected duty-cycle value DUTB2 (the feedforward controlled quantity for the fluid-flow restricting degree of the movable-vane turbine 4A) by adding the feedback correction value DUTS to the corrected basic duty-cycle value DUTB2 (see step S51 of FIG. 7). In step S42, a so-called DT1-control duty-cycle correction value DUTDT based on the rate-of-increase ΔQAVNT in the actual intake-air flow rate QAVNT (or the derivative dQAVNT/dt, which is the time rate of change of the actual intake-air flow rate QAVNT with respect to t), is arithmetically calculated or retrieved from a predetermined or preprogrammed map data. The so-called DT1-control duty-cycle correction value DUTDT based on the rate-of-increase ΔQAVNT is necessary to effectively suppress the excessive rise in boost pressure, occurring in the presence of a large rate-of-increase ΔQAVNT. In step S43, a test is made to determine whether the rate-of-increase ΔN of the engine speed N is above a predetermined threshold value DN2. In step S44, a test is made to determine whether the rate-of-increase ΔQAVNT of the actual intake-air flow rate QAVNT is above a predetermined threshold value DQ2. When the answer to step S43 is affirmative (YES) and the answer to step S44 is affirmative (YES), the processor of the ECU 14 decides that the engine/vehicle is in a heavy-acceleration state where there is an increased tendency for the turbine 4A of the variable nozzle turbocharger 4 to excessively rotate. Thus, the routine proceeds to step S45. In step S45, in order to obtain the final duty-cycle value LADUTY, the corrected basic duty-cycle value DUTB2 of the PWM signal output from the ECU to the duty-cycle controlled valve 10 is corrected by the DT1-control duty-cycle correction value DUTDT, in accordance with the following expression (7).

$$LADUTY = DUTB2 - DUTDT \quad (7)$$

where the DT1-control duty-cycle correction value DUTDT is a positive value. As seen in the expression (7), during the heavy acceleration, the final duty-cycle value LADUTY is decreasingly corrected by the correction value DUTDT, and as a result the controlled quantity of the fluid-flow restricting degree of the movable-vane turbine 4A of the variable nozzle turbocharger 4 is decreased, that is, the inlet opening of the movable-vane turbine 4A is increased, thus effectively suppressing the excessive rise in rotation of the turbocharger 4. Under this condition, when the rate-of-increase ΔQAVNT of the actual intake-air flow rate becomes less than the predetermined threshold value DQ2, that is, in case that the condition ΔQAVNT<DQ2 becomes satisfied, the routine proceeds from step S44 to step S46. In step S46, a test is made to determine whether the deviation of the actual intake-air flow rate QAVNT reaches a deviation less than a predetermined level QCSSPA with respect to the final desired intake-air flow rate QCSSP2. That is, the difference (QCSSP2−QCSSPA) between the final desired intake-air flow rate QCSSP2 and the predetermined level QCSSPA is compared with the actual intake-air flow rate QAVNT detected by the air-flow meter 17. When the answer to step S46 is affirmative (YES), that is, in case that the condition QCSSP2−QCSSPA<QAVNT is satisfied, step S47 occurs. In step S47, a test is made to determine whether the rate-of-increase ΔQAVNT is above a predetermined threshold value DQ3 (<DQ2). When the answer to step S47 is affirmative (YES), that is, when the condition ΔQAVNT≧DQ3 is satisfied, the routine flows to step S45 in which the inlet opening of the movable-vane turbine 4A is increasingly corrected by the DT1-control duty-cycle correction value DUTDT, and whereby the actual intake-air flow rate QAVNT can more quickly approach to the final desired intake-air flow rate QCSSP2, while effectively suppressing overshoot. Thereafter, when the processor determines that the rate-of-increase ΔN (=$N_{new}-N_{old}$) of the engine speed becomes less than the predetermined threshold value DN2 through step S43, or when the condition (QCSSP2−QCSSPA) ≧QAVNT is satisfied in step S46, or when the condition ΔQAVNT<DQ3 is satisfied in step S47, the routine proceeds to step S48 shown in FIG. 7. In step S48, the processor arithmetically calculates a decision criterion Tm necessary to determine as to whether feedback based on the result of comparison (QCSSP2−QAVNT) between the actual intake-air flow rate QAVNT and the final desired intake-air flow rate QCSSP2 should be inhibited or permitted. Concretely, the decision criterion for feedback is defined in terms of a boundary fuel-injection amount Tm by which the feedback-control inhibition zone is bored from the feedback-control permission zone. In step S48, the boundary fuel-injection amount Tm necessary for decision of feedback inhibition is arithmetically calculated as a function f(N) of the engine speed data N from a preprogrammed characteristic map illustrating the relationship between the engine speed N and the boundary fuel-injection amount Tm. In step S49, a test is made to determine whether the basic fuel-injection amount indicative data Tp (regarded as a representative value of engine load) is below the boundary fuel-injection amount Tm for decision of the feedback-control inhibition zone. When the answer to step S49 is affirmative (YES), that is, when the condition Tp≦Tm is satisfied, the ECU determines that the current operating condition is in the feedback-control inhibition zone. Thereafter, the routine proceeds to step S50. In step S50, the final duty-cycle value LADUTY is updated by the corrected basic duty-cycle value DUTB2. Conversely, if the answer to step S49 is negative (NO), that is, in case of Tp>Tm, the ECU determines that the current operating condition is in the feedback-control permission zone. In this manner, step S49 senses the feedback-control permission zone, the routine flows from step S49 to step S51. In step S51, the final duty-cycle value LADUTY is arithmetically calculated or computed by adding the feedback correction value DUTS (calculated through step S41 of FIG. 6) to the corrected basic duty-cycle value DUTB2. As a result, the PWM signal of the duty-cycle value obtained as the sum (the linear combination) of the feedforward controlled quantity DUTB2 and the feedback correction value DUTS, is output to the duty-cycle controlled valve 10.

Referring now to FIG. 8, there is shown the simplified operational block diagram explaining greatly-balanced integrated control between the EGR-rate control and the variable nozzle turbocharger control. As seen in FIG. 8, in the system of the embodiment, first, the engine operating conditions (N, Tp, Tw, and the like) are detected (see the block 101). Based on input information data (particularly engine speed and load) indicative of the engine operating conditions, the desired EGR rate MEGRM is arithmetically calculated (see the block 102), and at the same time the desired turbo-charging controlled quantity or the basic duty-cycle value DUTB1 is arithmetically calculated (see the block 105). At least one correcting action such as engine-temperature dependent correction (based on the operating conditions except the engine speed and load) are made with respect to the desired EGR rate MEGRM (see the block 103). For example, the engine-temperature dependent EGR-rate correction can be performed by multiplying the desired EGR rate MEGRM with the first correction factor indicated in steps S4 or S32. EGR control is executed in accordance with the corrected EGR rate (see the block 104). In order to precisely reflect changes in the intake-air flow rate occurring owing to changes or correcting actions in the EGR rate, when the correcting action is made to the basic value MEGRM of the desired EGR rate by the desired EGR-rate correction section or block 103, the desired turbo-charging controlled quantity correction section or block 106 timely properly corrects the desired turbo-charging controlled quantity in response to the correcting action of the desired EGR rate MEGRM, so that the second correction factor VEGR of the basic duty-cycle value DUTB1 is arithmetically calculated accounting for the correction factors KEGR1 and Z correlated with the correcting action for the EGR rate through steps S32–S36 of FIG. 5. Therefore, the inlet opening area of the movable-vane turbine 4A of the variable nozzle turbocharger 4 can be effectively corrected in response to the change in the desired EGR rate, thus maintaining an optimal turbo-charging state suitable for engine operating conditions. In other words, the desired turbo-charging controlled quantity (or the basic duty-cycle value DUTB1) for the variable nozzle turbocharger control valve 10 is properly corrected by the second correction factor VEGR in correlation with changes in the EGR rate (see the arrow directed from the block 103 to the block 106). As set forth above, the movable-vane turbine 4A of the variable nozzle turbocharger 4 can be optimally controlled in response to a controlled duty-cycle value LADUTY of the pulsewidth modulated (PWM) control signal applied to the duty-cycle controlled valve 10 (see the block 107), which duty-cycle value is properly adjusted, adequately considering changes in the intake-air flow rate occurring owing changes in the EGR rate. Moreover, a correcting action, which is made to the turbo-charging controlled quantity or the controlled duty-cycle value in response to the correcting action made to the desired EGR rate MEGRM, is performed as a correcting action for the feedforward controlled quantity DUTB1. Therefore, the turbo-charging state of the turbocharger 4 can be rapidly converged to a stable state by way of correction executed in advance of the actual change in turbo-charging state, i.e., the change in the turbo-charging state which will occur owing to the change in the desired EGR rate. This prevents the delay of response time of the system, thus avoiding deterioration in driveability. Under predetermined operating conditions, the feedback correction value DUTS is added to the feedforward controlled quantity DUTB2, such that the feedback correction is made to the desired turbo-charging controlled quantity or the feedforward controlled quantity DUTB1 (DUTB2) and the feedback control is performed by comparing the final desired intake-air flow rate QCSSP2 with the actual intake-air flow rate QAVNT. Therefore, the actual turbo-charging state of the variable nozzle turbocharger 4 can be accurately adjusted to its desired value. Furthermore, in the feedback inhibition zone during the EGR control, the feedback control is inhibited and in lieu thereof the open-loop feedforward control is executed on the basis of the feedforward controlled quantity DUTB1 (DUTB2). This avoids undesired mutual interference between the EGR control system and the variable nozzle turbocharger control system, thereby insuring a stable turbo-charger control. Even during the feedback inhibition, the feedforward controlled quantity DUTB1 is properly corrected according to the change (KEGR1, Z) in the desired EGR rate, as the corrected feedforward controlled quantity DUTB2 (see step S37 of FIG. 5). This insures a proper turbo-charging state in the feedback inhibition zone during the EGR control. The correcting action made to the feedforward controlled quantity depending on the change in the desired EGR rate specifically during engine/vehicle acceleration, is effective to avoid a rapid rise in boost pressure which pressure-rise will occur when shifting from the EGR permission region to the non-EGR region. Additionally, as seen in FIGS. 3 or 5, the correcting action of the desired EGR rate MEGRM is regarded as the change in the intake-air flow rate and reflected as a correction value of the intake-air flow rate. That is, the correction made to the desired EGR rate is converted as the correction value of intake-air flow rate o fresh air induced into the engine, and thus the basic desired intake-air flow rate QCSSP1 or the basic duty-cycle value DUTB1 for the variable nozzle turbocharger control is suitably corrected on the basis of the correction factors KEGR1 and Z necessary to correct the desired EGR rate MEGRM. This ensures satisfactory cross-correlation control between the EGR control system and the variable nozzle turbocharger control system. In embodiment, as correction factors for the intake-air flow rate based on the change in the desired EGR rate, the air-density dependent correction factor (ADF1; ADF2) is used in addition to the engine-coolant-temperature dependent correction factor (the first EGR-rate correction factor) KEGR1. That is, the air-density sensor such as an atmospheric-pressure sensor, an intake-air temperature sensor, or the like, is utilized in addition to the engine coolant temperature sensor. The accuracy of the variable nozzle turbocharger control can be greatly enhanced, since the controlled duty-cycle value DUTB2 (the feedforward controlled quantity) satisfactorily reflects the change in the desired EGR rate, based on the change in air-density as well as the change in engine temperature.

The entire contents of Japanese Patent Application No. P10-167175 (filed Jun. 15, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claim is:

1. A turbocharger control system for a turbocharged internal combustion engine equipped with an exhaust-gas recirculation control system recycling part of inert exhaust gas back through the engine under predetermined operating conditions of the engine, comprising:

a variable-displacement turbocharger variably adjusting a turbo-charging state; and a turbocharger control unit correcting a controlled quantity of said variable-displacement turbocharger in response to correction made to a desired EGR rate for the exhaust-gas recirculation control system.

2. A turbocharger control system for a turbocharged internal combustion engine equipped with an exhaust-gas recirculation control system recycling part of inert exhaust gas back through the engine under predetermined operating conditions of the engine, comprising:

a variable-displacement turbocharger variably adjusting a turbo-charging state;

sensors detecting operating conditions of the engine;

a turbocharger control unit configured to be electronically connected to said sensors and said variable-displacement turbocharger for automatically regulating the turbo-charging state; said turbocharger control unit comprising (1) a desired EGR rate arithmetic-calculation section arithmetically calculating a desired EGR rate (MEGRM) as a function of a first predetermined engine operating condition of the operating conditions detected by said sensors, (2) a desired turbo-charging controlled quantity arithmetic-calculation section arithmetically calculating a desired turbo-charging controlled quantity of said variable-displacement turbocharger as a function of the first predetermined engine operating condition, (3) a desired EGR-rate correction section correcting the desired EGR rate (MEGRM), and (4) a desired turbo-charging controlled quantity correction section correcting the desired turbo-charging controlled quantity in response to correction made to the desired EGR rate by said desired EGR-rate correction section.

3. The turbocharger control system as claimed in claim 2, wherein the correction, which is made to the desired turbo-charging controlled quantity in response to the correction made to the desired EGR rate, is executed as a correcting action made to a feedforward controlled quantity.

4. The turbocharger control system as claimed in claim 3, which further comprises an air-flow meter detecting an actual intake-air flow rate (QAVNT) and a desired turbo-charging state arithmetic-calculation section estimating a desired value (QCSSP2) of the turbo-charging state, and wherein feedback control is executed so that feedback correction based on comparison of the desired value (QCSSP2) of the turbo-charging state with the actual intake-air flow rate (QAVNT) is made with respect to the feedforward controlled quantity under a predetermined operating condition of the engine.

5. The turbocharger control system as claimed in claim 4, wherein, when the exhaust-gas recirculation control system executes EGR control, the feedback control of the variable-displacement turbocharger is inhibited, and open-loop feedforward control is executed on the basis of only the feedforward controlled quantity.

6. The turbocharger control system as claimed in claim 2, wherein said desired turbo-charging controlled quantity correction section comprises a converting section converting the correction made to the desired EGR rate into a correction value of an intake-air flow rate of fresh air induced into the engine, and an arithmetic-calculation section arithmetically calculating a correction value of the variable-displacement turbocharger, based on the correction value of the intake-air flow rate, and whereby said desired turbo-charging controlled quantity correction section corrects the desired turbo-charging controlled quantity by the correction value of the variable-displacement turbocharger.

7. The turbocharger control system as claimed in claim 2, wherein said desired EGR-rate correction section corrects the desired EGR rate (MEGRM) as a function of a second predetermined engine operating condition of the operating conditions detected by said sensors, except the first predetermined engine operating condition.

8. The turbocharger control system as claimed in claim 2, wherein the first predetermined engine operating condition includes at least one of engine speed and engine load, and the second predetermined engine operating condition includes at least one of engine temperature, atmospheric pressure, and intake-air temperature.

9. In an internal combustion engine equipped with an exhaust-gas recirculation control system recycling part of inert exhaust gas back through the engine under predetermined operating conditions of the engine, and a variable-displacement turbocharger variably adjusting a turbo-charging state, comprising:

a sensor means for detecting operating conditions of the engine;

a turbocharger control means configured to be electronically connected to said sensor means and said variable-displacement turbocharger for automatically regulating the turbo-charging state; said turbocharger control means comprising (1) a desired EGR rate arithmetic-calculation means for arithmetically calculating a desired EGR rate (MEGRM) as a function of a first predetermined engine operating condition of the operating conditions detected by said sensors, (2) a desired turbo-charging controlled quantity arithmetic-calculation means for arithmetically calculating a desired turbo-charging controlled quantity of said variable-displacement turbocharger as a function of the first predetermined engine operating condition, (3) a desired EGR-rate correction means for correcting the desired EGR rate (MEGRM), and (4) a desired turbo-charging controlled quantity correction means for correcting the desired turbo-charging controlled quantity in response to correction made to the desired EGR rate by said desired EGR-rate correction section.

10. A method for controlling a variable-displacement turbocharger employed in an internal combustion engine, wherein the engine includes an exhaust-gas recirculation control system recycling part of inert exhaust gas back through the engine and having sensors detecting operating conditions of the engine, and an electronic control unit configured to be electronically connected to the sensors and the variable-displacement turbocharger for automatically regulating a turbo-charging state of the variable-displacement turbocharger, the method comprising:

correcting a controlled quantity of the variable-displacement turbocharger in response to correction made to a desired EGR rate for the exhaust-gas recirculation control system.

11. A method for controlling a variable-displacement turbocharger employed in an internal combustion engine, wherein the engine includes an exhaust-gas recirculation control system recycling part of inert exhaust gas back through the engine and having sensors detecting operating conditions of the engine, an air-flow meter detecting an actual intake-air flow rate (QAVNT), and an electronic control unit configured to be electronically connected to the sensors, the air-flow meter and the variable-displacement turbocharger for automatically regulating a turbo-charging state of the variable-displacement turbocharger, the method comprising:

arithmetically calculating a desired EGR rate (MEGRM) as a function of a first predetermined engine operating condition of the operating conditions detected by the sensors, arithmetically calculating a desired turbo-charging controlled quantity of the variable-displacement turbocharger as a function of the first predetermined engine operating condition, correcting the desired EGR rate (MEGRM), correcting the desired turbo-charging controlled quantity in response to correction made to the desired EGR rate, said correction, which is made to the desired turbo-charging controlled quantity in response to the correction made to the desired EGR rate, is executed as a correcting action made to a feedforward controlled quantity, estimating a desired value (QCSSP2) of the turbo-charging state, arithmetically calculating a feedback correction value (DUTS) by comparing the desired value (QCSSP2) of the turbo-charging state with the actual intake-air flow rate (QAVNT), executing feedback correction with respect to the feedforward controlled quantity, using the feedback correction value (DUTS) under a predetermined operating condition of the engine.

12. The method as claimed in claim 11, which further comprises inhibiting the feedback control of the variable-displacement turbocharger and executing open-loop feedforward control on the basis of only the feedforward controlled quantity, when the exhaust-gas recirculation control system executes EGR control.

13. The method as claimed in claim 11, which further comprises converting the correction made to the desired EGR rate into a correction value of an intake-air flow rate of fresh air induced into the engine, and arithmetically calculating a correction value of the variable-displacement turbocharger on the basis of the correction value of the intake-air flow rate, so that the desired turbo-charging controlled quantity is corrected by the correction value of the variable-displacement turbocharger.

14. The method as claimed in claim 11, which further comprises correcting the desired EGR rate (MEGRM) as a function of a second predetermined engine operating condition of the operating conditions detected by the sensors, except the first predetermined engine operating condition.

* * * * *